United States Patent
Shen et al.

(10) Patent No.: US 12,108,462 B2
(45) Date of Patent: Oct. 1, 2024

(54) INFORMATION TRANSMISSION METHOD FOR RANDOM ACCESS PROCEDURE AND TERMINAL

(71) Applicant: VIVO MOBILE COMMUNICATION CO., LTD., Guangdong (CN)

(72) Inventors: Xiaodong Shen, Guangdong (CN); Peng Sun, Guangdong (CN); Xiaohang Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 390 days.

(21) Appl. No.: 17/488,679

(22) Filed: Sep. 29, 2021

(65) Prior Publication Data

US 2022/0022268 A1 Jan. 20, 2022

Related U.S. Application Data

(63) Continuation of application No. PCT/CN2020/081697, filed on Mar. 27, 2020.

(30) Foreign Application Priority Data

Mar. 29, 2019 (CN) .......................... 201910253175.6

(51) Int. Cl.
*H04W 74/0833* (2024.01)
*H04L 5/00* (2006.01)
*H04W 72/1268* (2023.01)

(52) U.S. Cl.
CPC ....... *H04W 74/0841* (2013.01); *H04L 5/0051* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2016/0037352 A1* | 2/2016 | Wei | H04W 72/1268 |
| | | | 455/454 |
| 2018/0027554 A1 | 1/2018 | Yerramalli et al. | |
| 2019/0313458 A1* | 10/2019 | Zeng | H04J 13/0044 |

FOREIGN PATENT DOCUMENTS

| | | |
|---|---|---|
| CN | 106576341 A | 4/2017 |
| CN | 109479318 A | 3/2019 |
| EP | 3550928 A1 | 9/2019 |

(Continued)

OTHER PUBLICATIONS

ZTE, 3GPP TSG RAN WG1 #96, "Summary of 7.2.1.1 Channel Structure for Two-step RACH", R1-1903435, dated Feb. 25, 2019, all pages). (Year: 2019).*

(Continued)

*Primary Examiner* — Srinivasa R Reddivalam
(74) *Attorney, Agent, or Firm* — Price Heneveld, LLP (57) ABSTRACT

This disclosure discloses an information transmission method for a random access procedure and a terminal. The method includes: obtaining a mapping relationship between interlaces of physical random access channel PRACH resources and physical uplink shared channel PUSCH resources, where the interlace includes at least one PRACH resource unit; and sending a random access message on a random access resource according to the mapping relationship, where the random access resource includes the PUSCH resources and the PRACH resources.

20 Claims, 4 Drawing Sheets

(56) References Cited

FOREIGN PATENT DOCUMENTS

WO     2017151187 A1    9/2017

OTHER PUBLICATIONS

Qualcomm Inc., "UL signals and channels for NR-U", 3GPP TSG RAN WG1 Meeting #95, R1-183412, Spokane, USA Nov. 12-Nov. 16, 2018.
LG Electronics, "Physical layer design of UL signals and channels for NR unlicensed operation", 3GPP TSG RAN WG1 Meeting #95, R1-1812559, Spokane, USA, Nov. 12-16, 2018.
CATT, "Discussion on Channel Structure for 2-Step RACH", 3GPP TSG RAN WG1 Meeting #96, R1-1902027, Athens, Greece, Feb. 25-Mar. 1, 2019.
"3rd Generation Partnership Project; Technical Specification Group Radio Access Network; NR; Physical layer procedures for data (Release 15)", 3GPP TS 38.214 V15.3.0 (Sep. 2018), Valbonne, France.
LG Electronics, "Physical layer design of initial access signals and channels for NR-U", 3GPP TSG RAN WG1 #96, R1-1902037, Athens, Greece, Feb. 25-Mar. 1, 2019.
Ericsson, "Feature lead summary for UL Signals and Channels", 3GPP TSG RAN WGI Meeting #94, RI-1811815, Chengdu, China, Oct. 8-12, 2018.

* cited by examiner

INFORMATION TRANSMISSION METHOD FOR RANDOM ACCESS PROCEDURE AND TERMINAL

CROSS-REFERENCE TO RELATED APPLICATIONS

This application is a continuation application of PCT Application No. PCT/CN2020/081697 filed on Mar. 27, 2020, which claims priority to Chinese Patent Application No. 201910253175.6, filed in China on Mar. 29, 2019, disclosures of which are incorporated herein by reference in their entireties.

TECHNICAL FIELD

This disclosure relates to the field of communications technologies, and in particular, to an information transmission method for a random access procedure and a terminal.

BACKGROUND

The 5th generation (5G) mobile communications systems, or new radio (NR) systems need to adapt to diverse use cases and service requirements. Main use cases of the NR system include: enhanced mobile broadband (eMBB), massive machine type communication (mMTC), and ultra-reliable and low latency communications (URLLC). These use cases impose requirements of high reliability, low latency, large bandwidth, and wide coverage on the system. In order to reduce overheads of downlink control signaling for a periodic service with a fixed packet size, a network device may continuously allocate some resources in a semi-persistent scheduling manner for transmission of the periodic service.

In uplink transmission mode, if a terminal needs to send uplink data, uplink timing synchronization has to be obtained through a random access procedure, that is, the terminal obtains uplink timing advance (TA) information from a network device. After uplink synchronization is implemented, the terminal can send uplink data through dynamic scheduling or semi-persistent scheduling. When the uplink data packet is small, the terminal can send uplink data in an unsynchronized state to reduce resource and power consumption.

In the random access procedure, for example, a contention-free random access procedure or a contention-based random access procedure, the terminal is also in the unsynchronized state when sending a preamble, so a cyclic prefix (CP) needs to be added to the preamble to offset an impact of transmission delay. There is a guard interval (Guard) between different terminals to reduce interference.

When the terminal sends uplink data in the unsynchronized state, for example, sending a physical uplink shared channel (PUSCH) in the unsynchronized state, in the contention-free random access procedure, that is, a 2-step physical random access channel (PRACH), the terminal sends a random access message carrying the PUSCH, or referred to as message A (msgA), when initiating random access. In this case, the msgA received by the network device has both the PRACH and PUSCH, and the network device needs to perform blind detection on all possible PRACH and PUSCH occasions, making the processing complex.

SUMMARY

According to a first aspect, an embodiment of this disclosure provides an information transmission method for a random access procedure, applied to a terminal side and including:

obtaining a mapping relationship between interlaces of physical random access channel PRACH resources and physical uplink shared channel PUSCH resources, where the interlace includes at least one PRACH resource unit; and sending a random access message on a random access resource according to the mapping relationship, where the random access resource includes the PUSCH resources and the PRACH resources.

According to a second aspect, an embodiment of this disclosure further provides a terminal, including:

a first obtaining module, configured to obtain a mapping relationship between interlaces of physical random access channel PRACH resources and physical uplink shared channel PUSCH resources, where the interlace includes at least one PRACH resource unit; and a sending module, configured to send a random access message on a random access resource according to the mapping relationship, where the random access resource includes the PUSCH resources and the PRACH resources.

According to a third aspect, an embodiment of this disclosure provides a terminal. The terminal includes a processor, a memory, and a computer program stored in the memory and running on the processor. When the computer program is executed by the processor, the steps of the foregoing information transmission method for a random access procedure are implemented.

According to a fourth aspect, an embodiment of this disclosure provides a non-transitory computer-readable storage medium, where the non-transitory computer-readable storage medium stores a computer program. When the computer program is executed by a processor, the steps of the foregoing information transmission method for a random access procedure are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system may implement radio technologies such as CDMA2000 and universal terrestrial radio access (UTRA). UTRA includes wideband CDMA (Wideband Code Division Multiple Access, WCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). Techniques described in this specification can be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
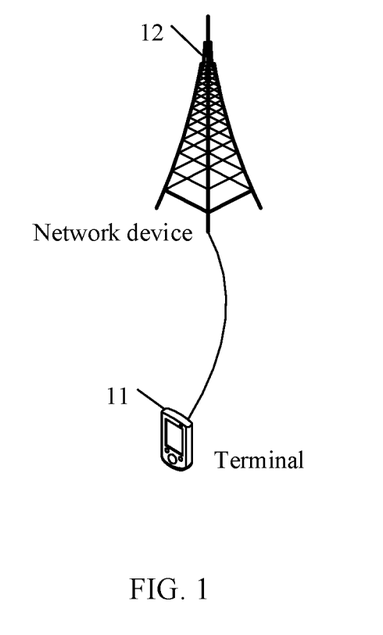
FIG. 1 is a block diagram of a mobile communications system to which an embodiment of this disclosure may be applied.

FIG. 1 is a block diagram of a wireless communications system applicable to an embodiment of this disclosure. The wireless communications system includes a terminal 11 and a network device 12. The terminal 11 may also be referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that the specific type of the terminal 11 is not limited in the embodiments of this disclosure. The network device 12 may be a base station or a core network, where the base station may be a base station of 5G or a later version (for example, gNB or 5G NR NB), or a base station in other communications systems (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate term in the art. As long as the same technical effect is achieved, the base station is not limited to a specific technical term. It should be noted that the base station in the NR system is taken only as an example in the embodiments of this disclosure, but a specific type of the base station is not limited.

The base station may communicate with the terminal 11 under the control of a base station controller. In various examples, the base station controller may be a part of the core network or some base stations. Some base stations may exchange control information or user data with the core network by using backhauls. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may communicate wirelessly with the terminal 11 through one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, and a picocell base station). The base station may also use different radio technologies, such as cellular and WLAN radio access technologies. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL) transmission (for example, from the terminal 11 to the network device 12), or a downlink for carrying a downlink (DL) transmission (for example, from the network device 12 to the terminal 11). The UL transmission may also be referred to as reverse link transmission, while the DL transmission may also be referred to as forward link transmission. A licensed band, an unlicensed band, or both may be used for downlink transmission. Similarly, a licensed band, an unlicensed band, or both may be used for uplink transmission.

Figure 2:
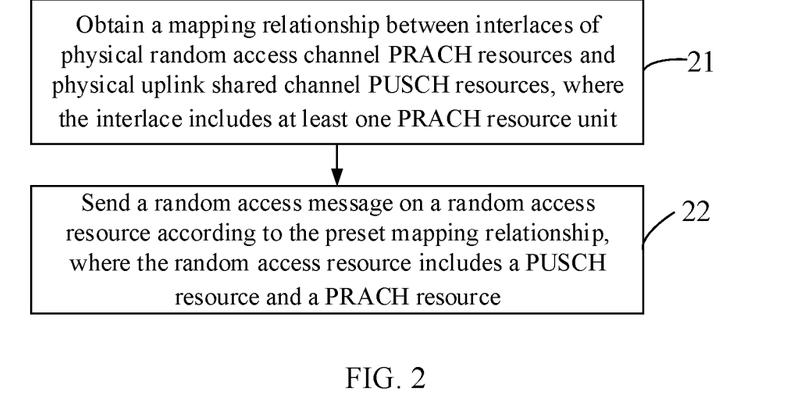
FIG. 2 is a schematic flowchart of an information transmission method for a random access procedure according to an embodiment of this disclosure.

An information transmission method for a random access procedure according to an embodiment of this disclosure is applied to a terminal. As shown in FIG. 2, the method includes the following steps.

Step 21: Obtain a mapping relationship between interlaces of physical random access channel PRACH resources and physical uplink shared channel PUSCH resources, where the interlace includes at least one PRACH resource unit.

The interlace is a resource unit obtained after the PRACH resource is interlaced. One interlace may include at least one PRACH resource unit, and the PRACH resource unit can be a resource granularity smaller than the interlace. The mapping relationship between interlaces of PRACH resources and PUSCH resources may be agreed upon by a protocol or configured by a network device.

The PRACH resource can be determined by the terminal by receiving system information, and the system information includes PRACH configuration information. For example, the number of synchronization signal blocks (Synchronization Signal and PBCH Block, SSB) sent by the network device in each SSB sending period is $N_{Tx}^{SSB}$; a random access channel occasion (PRACH Occasion, RO) number factor associated with each SSB is N, which denotes the number of SSBs corresponding to each RO, namely ssb-perRACH-Occasion, with a value of {⅛, ¼, ½, 1, 2, 4, 8, 16}; and the number of preambles associated with each RO is P, which denotes the number of preambles corresponding to the ROs that are associated with each SSB, namely CB-preambles-per-SSB*max(1, SSB-per-rach-occasion). In this case, the number of ROs after a round of mapping between SSBs and PRACHs is $R'=N_{Tx}^{SSB}*1/N$, the number of ROs in one association period is R, and the number of preambles associated with each RO is P. The ROs mapped in one association period are numbered as r (r=0, 1, 2, . . . , R−1), and the preambles in each RO is numbered as p (p=0, 1, 2, . . . , P). Thus, (r, p) denotes a PRACH resource unit, and resource units are numbered by numbering the preambles and then the ROs, that is, rp=P*r+p. The association period is an integer multiple of a PRACH configuration period. One SSB is associated with at least one RO in one association period, and the number R of ROs in one association period is an integer multiple of R'.

Step 22: Send a random access message on a random access resource according to the mapping relationship, where the random access resource includes the PUSCH resources and the PRACH resources.

The random access resource is used for a random access procedure, and includes the PUSCH resource and the PRACH resource. The PRACH resource is used to transmit a random access preamble, and the PUSCH resource is used to transmit random access-related information or uplink data. Correspondingly, the network device determines the PUSCH resource and the PRACH resource on the random access resource based on a same understanding as the terminal, so that the network device can quickly detect and demodulate the random access message (msgA) on the random access resource, to ensure that the random access procedure is normally performed.

In this way, in this embodiment of this disclosure, based on the mapping relationship between interlaces of PRACH resources and PUSCH resources, transmission positions of the interlaces of the PRACH resources may be determined based on transmission positions of the PUSCH resources, or transmission positions of the PUSCH resources may be determined based on transmission positions of the interlaces of the PRACH resources. The network device can avoid blind detection of all possible transmission positions of the PRACH resources and the PUSCH resources based on the same understanding, thereby reducing processing complexity and improving processing efficiency.

In some embodiments, before step 21, the method further includes: obtaining an interlace spacing; and dividing the PRACH resource into at least one interlace based on the interlace spacing. The interlace spacing may be configured by the network device, that is, the interlace spacing is configurable. Alternatively, the interlace spacing may be agreed upon by a protocol, and optionally, the interlace spacing may be 1 or N*R by default.

Optionally, the mapping relationship between interlaces of PRACH resources and PUSCH resources in this embodiment of this disclosure may include but is not limited to the following two types:

1. A first mapping relationship between PRACH resource units in the interlaces and physical uplink shared channel occasions (PUSCH Occasion, PUO) corresponding to the PUSCH resources The first mapping relationship may be a mapping relationship between PRACH resource units in interlaces in a PRACH resource group (or referred to as an RO group) and PUOs.

Optionally, in one PRACH resource group, the mapping relationship between interlaces and PUOs is a mapping in the order of interlace indexes and PUO indexes. PRACH resources in one association period can be classified as one or more PRACH resource groups. The PRACH resource group is in one association period, one association period includes at least one PRACH resource group, one PRACH resource group includes at least one random access channel occasion RO corresponding to the PRACH resource, and one RO corresponds to at least one PRACH resource unit. It should be noted that the interlaces may be in different ROs or in a same RO. That is, one interlace may include a plurality of PRACH resource units in different ROs, or one interlace may include a plurality of PRACH resource units in a same RO.

2. A second mapping relationship between PRACH resource units in the interlaces and PUSCH resource units in PUOs corresponding to the PUSCH resources The PUSCH resource unit is used to distinguish between users. Optionally, one PUSCH resource unit can be used to distinguish one user. The PUSCH resource unit is determined based on at least one related parameter (or referred to as a user discrimination factor) of the PUO. More related parameters indicate more PUSCH resource units that can be divided in the PUO, and more users that can be distinguished.

Optionally, the related parameter includes but is not limited to at least one of port information of a demodulation reference signal (DMRS) of the PUO and a scrambling identifier (scrambling ID) of the PUO. For example, the PUSCH resource units that can be divided in each PUO, that is, a total number K of users that can be distinguished by a PUO, can be configured in the following manners:
1. Related to a single parameter. DMRS port information is used as an example. If the number of DMRS ports is configured as D, K=D.
2. Related to multiple parameters. The DMRS port information and scrambling identifier are used as an example. If the number of DMRS ports is configured as D and the number of scrambling identifiers is configured as S, K=S*D. The PUSCH resource units that can be obtained through division in one PUO are numbered as k (k=1, 2, . . . , K−1). In the case of related to multiple parameters, a numbering rule can be prescribed, for example, the DMRS ports are numbered before the scrambling identifiers.

It is assumed that all valid PUSCH occasions configured for one association period are numbered as u (u=0, 1, 2, . . . , U−1) in a frequency-first time-second order, where U is the number of PUOs in the association period. In this case, in one association period, the PUSCH resource units are (u, k), which are numbered in a related-parameters-first and PUO-second order, that is, uk=K*u+k.

The second mapping relationship may be a mapping relationship between PRACH resource units in interlaces in a PRACH resource group and PUSCH resource units in the PUOs.

PRACH resources in one association period can be classified as one or more PRACH resource groups. The PRACH resource group is in one association period, one association period includes at least one PRACH resource group, one PRACH resource group includes at least one random access channel occasion RO corresponding to the PRACH resource, and one RO corresponds to at least one PRACH resource unit. It should be noted that the interlaces may be in different ROs or in a same RO. That is, one interlace may include a plurality of PRACH resource units in different ROs, or one interlace may include a plurality of PRACH resource units in a same RO.

In this embodiment of this disclosure, a PRACH resource unit may correspond to one random access preamble in an RO.

In the foregoing first mapping relationship and second mapping relationship, the PRACH resource group can be determined by using, but not limited to, one of the following manners:

Grouping manner 1: Classify all ROs in every T time domain units as a PRACH resource group, where T is a positive integer.

The network device configures or a protocol prescribes that all ROs in every T time domain units are in a same group in terms of time, where the time domain unit may be a symbol, a slot, a subframe, a frame, or the like.

Grouping manner 2: According to the order of RO numbers, every M ROs are classified as a PRACH resource group.

The network device configures or a protocol prescribes the number M of ROs in each PRACH resource group, and groups the ROs based on the quantity M in ascending order of the RO indexes.

Grouping manner 3: According to the number P of groups in one association period, all ROs in one association period are classified as P PRACH resource groups.

The network device configures or a protocol prescribes the number P of PRACH resource groups for classification in one association period, and the terminal can classify all ROs in one association period as P PRACH resource groups according to the implementation.

Grouping manner 4: All ROs in an association period are classified as one PRACH resource group.

When the network device does not configure configuration information related to grouping, the terminal classifies all ROs in an association period as one PRACH resource group by default, that is, one PRACH resource group for one association period.

In addition, when the network device does not configure configuration information related to grouping, the terminal may alternatively perform grouping by default by using a default value in the foregoing grouping manner 1, 2, or 3.

In some embodiments, in one association period, the mapping relationship is a mapping in the order of PRACH resource group indexes and PUO indexes. The first mapping relationship is used as an example. In one association period, the mapping relationship between PRACH resource units in the interlaces and the PUOs is a mapping in the order of the PRACH resource group indexes and the PUO indexes. That is, the PRACH resource units are mapped to the PUOs in ascending order of the PRACH resource group indexes, meaning that PRACH resource units in a next PRACH resource group are mapped after PRACH resource units in interlaces in one PRACH resource group are mapped. The second mapping relationship is used as an example. In one association period, the mapping relationship between PRACH resource units in interlaces and PUSCH resource units in the PUOs is a mapping in the order of PRACH resource group indexes and PUO indexes. That is, the PRACH resource units are sequentially mapped to PUSCH resource units in the PUOs in ascending order of the PRACH resource group indexes, meaning that PRACH resource units in a next PRACH resource group are mapped after PRACH resource units of interlaces in one PRACH resource group are mapped.

In some embodiments, in one PRACH resource group, the mapping relationship is a mapping in the order of the interlace indexes and PUO indexes. The first mapping relationship is used as an example. In one PRACH resource group, the mapping relationship between PRACH resource units in interlaces and PUOs is a mapping in the order of the interlace indexes and PUO indexes. That is, the PRACH resource units are sequentially mapped to PUOs in ascending order of the interlace indexes, meaning that PRACH resource units in a next interlace are mapped after PRACH resource units in one interlace are mapped. The second mapping relationship is used as an example. In one PRACH resource group, the mapping relationship between PRACH resource units in interlaces and PUSCH resource units in PUOs is a mapping in the order of the interlace indexes and PUO indexes. That is, the PRACH resource units are sequentially mapped to the PUSCH resource units in the PUOs in ascending order of the interlace indexes, meaning that PRACH resource units in a next interlace are mapped after PRACH resource units in one interlace are mapped.

Further, the mapping relationship between PRACH resource units in the interlaces in a PRACH resource group and PUSCH resource units in the PUOs may alternatively be a mapping in the order of the interlace indexes and PUSCH resource unit indexes. That is, the PRACH resource units are sequentially mapped to the PUSCH resource units in the PUOs in ascending order of the interlace indexes and the PUSCH resource indexes, meaning that the PRACH resource units in a next interlace are mapped after the PRACH resource units in one interlace are mapped.

In some embodiments, in one interlace, the mapping relationship is a mapping in the order of PRACH resource unit indexes and PUO indexes. The first mapping relationship is used as an example. In one interlace, the mapping relationship between PRACH resource units and PUOs is a mapping in the order of the PRACH resource unit indexes and PUO indexes. That is, the PRACH resource units are sequentially mapped to the PUOs in ascending order of the PRACH resource unit indexes, meaning that a next PRACH resource unit is mapped after one PRACH resource unit is mapped. The second mapping relationship is used as an example. In one interlace, the mapping relationship between PRACH resource units and PUSCH resource units in the PUOs is a mapping in the order of PRACH resource unit indexes and PUO indexes. That is, the PRACH resource units are sequentially mapped to the PUSCH resource units in the PUOs in ascending order of the PRACH resource unit indexes, meaning that after a next PRACH resource unit is mapped after one PRACH resource unit is mapped.

Further, in one interlace, the mapping relationship between PRACH resource units and PUSCH resource units in the PUOs is a mapping in the order of PRACH resource unit indexes and PUSCH resource unit indexes. That is, the PRACH resource units are sequentially mapped to the PUSCH resource units in the PUOs in ascending order of the PRACH resource unit indexes and PUSCH resource unit indexes, meaning that a next PRACH resource unit is mapped after one PRACH resource unit is mapped.

It should be noted that when the number of PRACH resource units included in one association period is less than the number of PUSCH resource units, a PUSCH resource unit to which no PRACH resource unit is mapped is no longer used.

Figure 3:
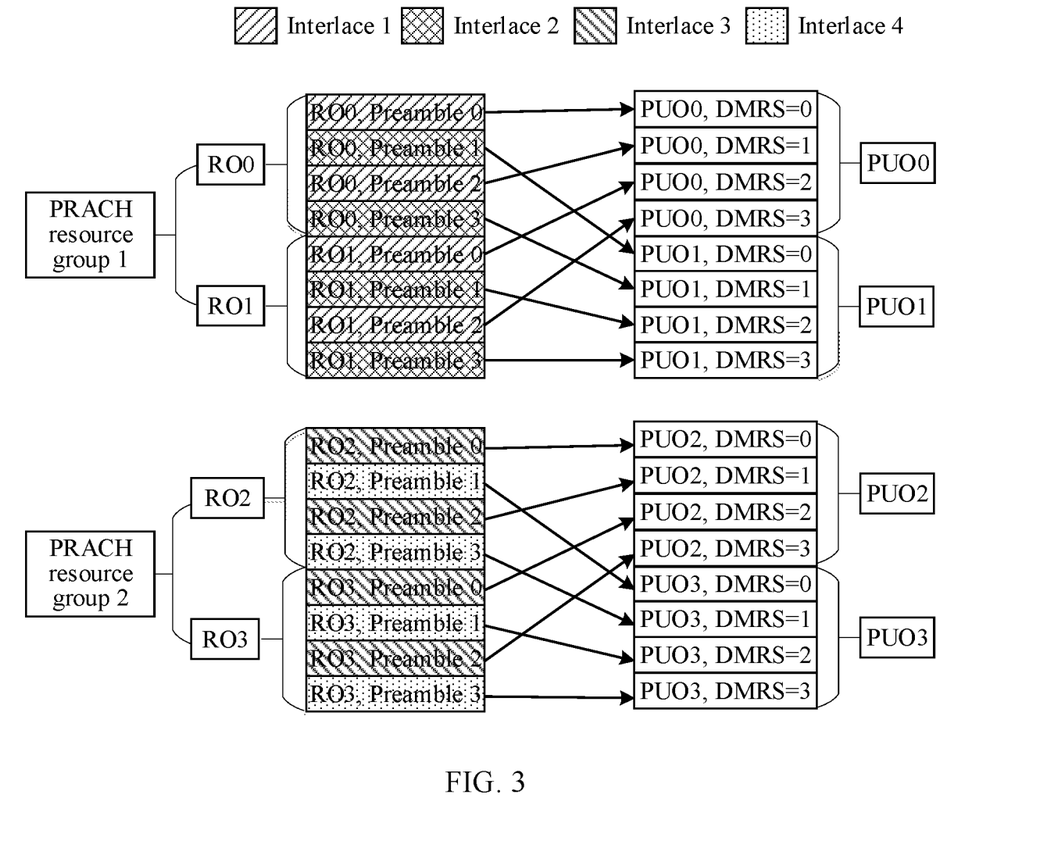
FIG. 3 is a first schematic diagram of a mapping relationship between PRACH resource units and PUSCH resource units according to an embodiment of this disclosure.

It is assumed that the number of ROs included in a PRACH resource group is M, and that the ROs are numbered r0, r0+1, r0+M−1, PRACH resources in the PRACH resource group are numbered P*r0, P*r0+1, P*(r0+M−1)+P−1. M*P PRACH resource units are grouped into interlaces. Assuming that an interlace spacing is x, a total of x interlaces are obtained, and the interlaces are numbered. For example, RO0, RO1, RO2, and RO3 are four ROs configured in an association period, and four preambles are configured for each RO. PUO0, PUO1, PUO2, and PUO3 are four PUOs configured in this association period, and four DMRS ports are configured for each PUO. As shown in FIG. 3, four ROs in an association period are classified as two PRACH resource groups, PRACH resource group 1 includes RO0 and RO1, and PRACH resource group 2 includes RO2 and RO3. Four preambles are configured for each RO: preamble 0, preamble 1, preamble 2, and preamble 3. In this case, PRACH resource units included in a first PRACH resource group include: (RO0, preamble 0), (RO0, preamble 1), (RO0, preamble 2), (RO0, preamble 3), (RO1, preamble 0), (RO1, preamble 1), (RO1, preamble 2), and (RO1, preamble 3). Assuming that the interlace spacing is 2, interlace 1 includes: (RO0, preamble 0), (RO0, preamble 2), (RO1, preamble 0), and (RO1, preamble 2); and interlace 2 includes (RO0, preamble 1), (RO0, preamble 3), (RO1, preamble 1), and (RO1, preamble 3). The PUSCH resource units in this association period include: (PUO0, DMRS=0), (PUO0, DMRS=1), (PUO0, DMRS=2), (PUO0, DMRS=3), (PUO1, DMRS=0), (PUO1, DMRS=1), (PUO1, DMRS=2), (PUO1, DMRS=3), (PUO2, DMRS=0), (PUO2, DMRS=1), (PUO2, DMRS=2), (PUO2, DMRS=3), (PUO3, DMRS=0), (PUO3, DMRS=1), (PUO3, DMRS=2), and (PUO3, DMRS=3).

The second mapping relationship is used as an example. The mapping relationship between PRACH resource units and PUSCH resource units is as follows: According to the order of the PRACH resource group indexes, the interlace indexes, and the PRACH resource unit indexes in ascending order, PRACH resource units are sequentially mapped to PUSCH resource units with the PUSCH resource unit indexes in ascending order and the PUO indexes in ascending order in the PUSCH resources. As shown in FIG. 3, the mapping relationship between PRACH resource units in PRACH resource group 1 and PUSCH resource units in PUOs is as follows: PRACH resource units in interlace 1 are sequentially mapped to four PUSCH resource units in PUO0, and PRACH resource units in interlace 2 are sequentially mapped to four PUSCH resource units in PUO1. The mapping relationship between PRACH resource units in PRACH resource group 2 and PUSCH resource units in PUOs is as follows: PRACH resource units in interlace 3 are sequentially mapped to four PUSCH resource units in PUO2, and PRACH resource units in interlace 4 are sequentially mapped to four PUSCH resource units in PUO3.

It should be noted that the PUOs can be independently configured, so that the mapping relationship between PRACH resource units and PUOs can be sequential mapping. In addition, the PUO can alternatively be configured with respect to the RO, meaning that there is a correspondence between ROs and PUOs. In this case, the mapping relationship between the interlaces and the PUSCH resources is the mapping relationship between the interlaces and PUSCH resources corresponding to the PRACH resources. In other words, the interlace of the PRACH resource can only be mapped to a PUSCH resource corresponding to the PRACH resource. Optionally, the mapping relationship between the interlaces and the PUSCH resources is the mapping relationship between the interlaces in the PRACH resource group and PUSCH resources in the corresponding PUSCH group. The corresponding PUSCH group is a group of PUSCH resources corresponding to PRACH resources in the PRACH resource group. In other words, an interlace in a PRACH resource group can only be mapped to a PUSCH resource corresponding to the PRACH resource in the PRACH resource group. In the corresponding PRACH resource group and PUSCH resource group, a mapping manner of the interlace and the PUSCH resource can also be implemented according to the foregoing embodiment. It should be noted that when the number of the PRACH resource units included in a PRACH resource group is less than that of the PUSCH resource units, a PUSCH resource unit to which no PRACH resource unit is mapped is no longer used.

Figure 4:
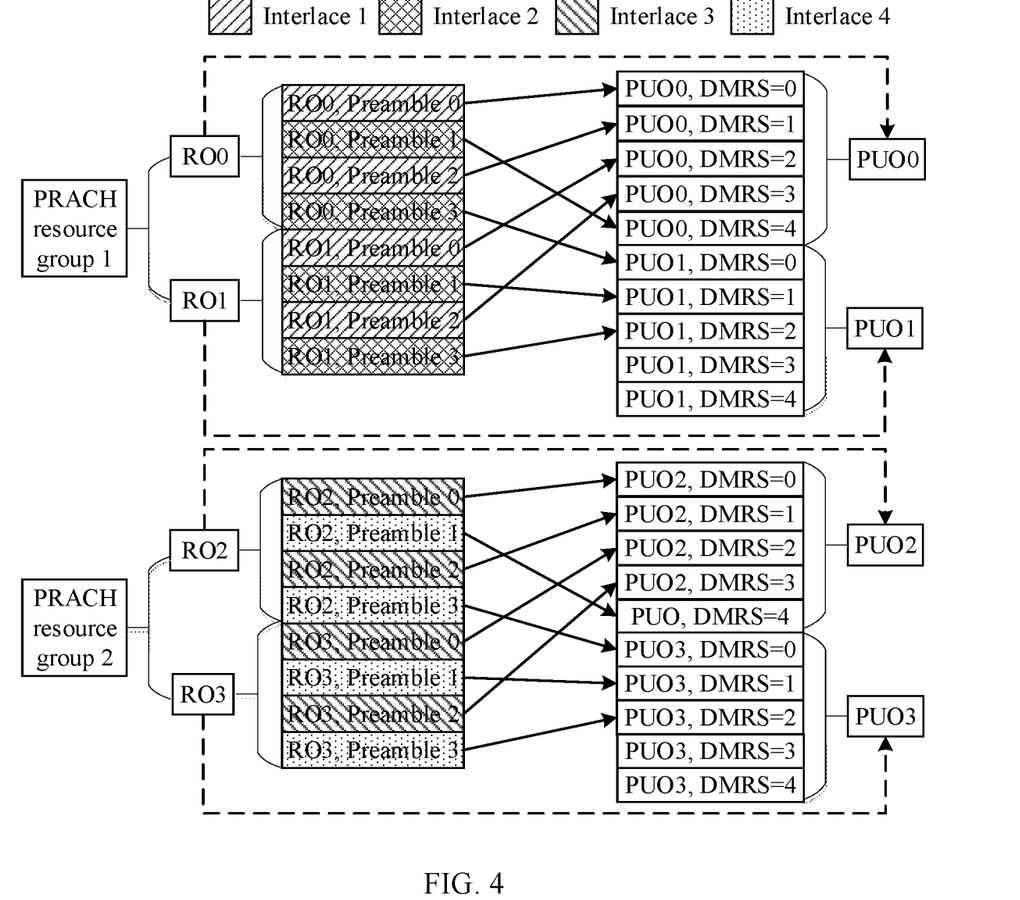
FIG. 4 is a second schematic diagram of a mapping relationship between PRACH resource units and PUSCH resource units according to an embodiment of this disclosure.

It is assumed that RO0, RO1, RO2, and RO3 are four ROs configured in an association period, and four preambles are configured for each RO. PUO0, PUO1, PUO2, and PUO3 are four PUOs configured in this association period, and five DMRS ports are configured for each PUO. RO0, RO1, RO2, and RO3 correspond to PUO0, PUO1, PUO2, and PUO3, respectively. As shown in FIG. 4, four ROs in an association period are classified as two PRACH resource groups, PRACH resource group 1 includes RO0 and RO1, and PRACH resource group 2 includes RO2 and RO3. Four preambles are configured for each RO: preamble 0, preamble 1, preamble 2, and preamble 3. In this case, PRACH resource units included in a first PRACH resource group include: (RO0, preamble 0), (RO0, preamble 1), (RO0, preamble 2), (RO0, preamble 3), (RO1, preamble 0), (RO1, preamble 1), (RO1, preamble 2), and (RO1, preamble 3). Assuming that the interlace spacing is 2, interlace 1 includes: (RO0, preamble 0), (RO0, preamble 2), (RO1, preamble 0), and (RO1, preamble 2); and interlace 2 includes (RO0, preamble 1), (RO0, preamble 3), (RO1, preamble 1), and (RO1, preamble 3). The PUSCH resource units in this association period include: (PUO0, DMRS=0), (PUO0, DMRS=1), (PUO0, DMRS=2), (PUO0, DMRS=3), (PUO0, DMRS=4), (PUO1, DMRS=0), (PUO1, DMRS=1), (PUO1, DMRS=2), (PUO1, DMRS=3), (PUO1, DMRS=4), (PUO2, DMRS=0), (PUO2, DMRS=1), (PUO2, DMRS=2), (PUO2, DMRS=3), (PUO2, DMRS=4), (PUO3, DMRS=0), (PUO3, DMRS=1), (PUO3, DMRS=2), (PUO3, DMRS=3), and (PUO3, DMRS=4). PRACH resource group 1 corresponds to PUO0 and PUO1, and PRACH resource group 2 corresponds to PUO2 and PUO3.

The second mapping relationship is used as an example. The mapping relationship between PRACH resource units and PUSCH resource units is as follows: According to the order of the PRACH resource group indexes, the interlace indexes, and the PRACH resource unit indexes in ascending order, PRACH resource units are sequentially mapped to PUSCH resource units with the PUSCH resource unit indexes in ascending order and the PUO indexes in ascending order in the PUSCH resources. As shown in FIG. 4, the mapping relationship between PRACH resource units in PRACH resource group 1 and PUSCH resource units in PUOs is as follows: PRACH resource units in interlace 1 are sequentially mapped to four PUSCH resource units in PUO0, PRACH resource units in interlace 2 are sequentially mapped to the last PUSCH resource unit in PUO0 and three PUSCH resource units in PUO1, and the remaining two PUSCH resource units are no longer used. The mapping relationship between PRACH resource units in PRACH resource group 2 and PUSCH resource units in PUOs is as follows: PRACH resource units in interlace 3 are sequentially mapped to four PUSCH resource units in PUO2, PRACH resource units in interlace 4 are sequentially mapped to the last PUSCH resource unit in PUO2 and three PUSCH resource units in PUO3, and the remaining two PUSCH resource units are no longer used.

It should be noted that, in a PRACH resource group, PRACH resource units of one RO can be mapped to PUSCH resource units corresponding to another RO in a same group. The PRACH resource units in one interlace can also be mapped to PUSCH resource units of different PUOs.

In the information transmission method for a random access procedure in this embodiment of this disclosure, the terminal obtains a mapping relationship between interlaces of physical random access channel PRACH resources and physical uplink shared channel PUSCH resources, and sends a random access message on a random access resource according to the mapping relationship, where the random access resource includes a PUSCH resource and a PRACH resource. In this way, a network device does not need to perform blind detection on all possible transmission positions of the PRACH resources and PUSCH resources in a random access procedure, thereby reducing processing complexity.

The information transmission method for a random access procedure in different scenarios is described in the foregoing embodiments. The following will further describe a terminal corresponding to the method with reference to an accompanying drawing.

Figure 5:
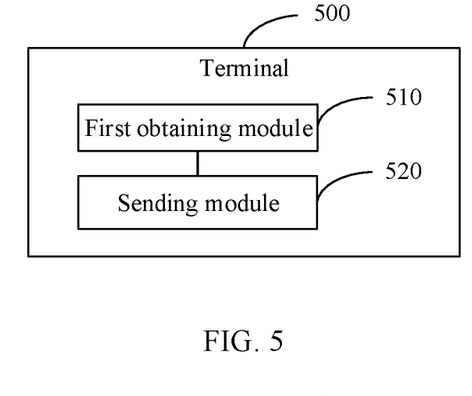
FIG. 5 is a schematic modular structure diagram of a terminal according to an embodiment of this disclosure.

As shown in FIG. 5, a terminal 500 in this embodiment of this disclosure can implement details of the method in the foregoing embodiment, that is, obtaining a mapping relationship between an interlace of a physical random access channel PRACH resource and a physical uplink shared channel PUSCH resource, where the interlace includes at least one PRACH resource unit; and sending a random access message on a random access resource according to the mapping relationship, where the random access resource includes the PUSCH resource and the PRACH resource, and can achieve a same effect. The terminal 500 specifically includes the following functional modules:

a first obtaining module 510, configured to obtain a mapping relationship between interlaces of physical random access channel PRACH resources and physical uplink shared channel PUSCH resources, where the interlace includes at least one PRACH resource unit; and a sending module 520, configured to send a random access message on a random access resource according to the mapping relationship, where the random access resource includes the PUSCH resources and the PRACH resources.

Optionally, the terminal 500 further includes:

a second obtaining module, configured to obtain an interlace spacing; and a dividing module, configured to divide the PRACH resource into at least one interlace based on the interlace spacing.

Optionally, the mapping relationship includes:

a first mapping relationship between PRACH resource units in the interlaces and physical uplink shared channel occasions PUOs corresponding to the PUSCH resources;

or a second mapping relationship between PRACH resource units in the interlaces and PUSCH resource units in PUOs corresponding to the PUSCH resources.

Optionally, the PUSCH resource unit is determined based on at least one related parameter of the PUO.

Optionally, the related parameter includes at least one of demodulation reference signal DMRS port information of the PUO and a scrambling identifier of the PUO.

Optionally, the first mapping relationship includes:

a mapping relationship between PRACH resource units in interlaces in a PRACH resource group and the PUOs.

Optionally, in one PRACH resource group, the mapping relationship between interlaces and PUOs is a mapping in the order of interlace indexes and PUO indexes.

Optionally, the second mapping relationship includes:

a mapping relationship between PRACH resource units in interlaces in a PRACH resource group and PUSCH resource units in the PUOs.

Optionally, in one PRACH resource group, the mapping relationship between PRACH resource units in interlaces and PUSCH resource units in the PUOs is a mapping in the order of interlace indexes and PUSCH resource unit indexes.

Optionally, in one interlace, the mapping relationship between PRACH resource units and PUSCH resource units in the PUOs is a mapping in the order of PRACH resource unit indexes and PUSCH resource unit indexes.

Optionally, the PRACH resource group is in one association period, one association period includes at least one PRACH resource group, one PRACH resource group includes at least one random access channel occasion RO corresponding to the PRACH resource, and one RO corresponds to at least one PRACH resource unit.

Optionally, one PRACH resource unit corresponds to one random access preamble in one RO.

Optionally, the PRACH resource group is determined based on one of the following manners:

classifying all ROs in every T time domain units as a PRACH resource group;

classifying every M ROs as a PRACH resource group in the order of RO indexes;

classifying all ROs in one association period as P PRACH resource groups according to the number P of groups in one association period; and classifying all ROs in an association period as one PRACH resource group, where T, M and P are all positive integers.

Optionally, in one association period, the mapping relationship is a mapping in the order of PRACH resource group indexes and PUO indexes.

Optionally, the mapping relationship between the interlaces and the PUSCH resources is a mapping relationship between the interlaces and PUSCH resources corresponding to the PRACH resources.

It should be noted that the terminal embodiment of this disclosure corresponds to the foregoing method embodiment, and the implementations and achieved technical effects of the foregoing method embodiment are all applicable to this terminal embodiment. The terminal according to this embodiment of this disclosure obtains a mapping relationship between interlaces of physical random access channel PRACH resources and physical uplink shared channel PUSCH resources, and sends a random access message on a random access resource according to the mapping relationship, where the random access resource includes the PUSCH resources and the PRACH resources. In this way, a network device does not need to perform blind detection on all possible transmission positions of the PRACH resources and PUSCH resources in a random access procedure, thereby reducing processing complexity.

It should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or some of the modules may be implemented in a form of software invoked by a processing component, and some of the modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (digital signal processor, DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

Figure 6:
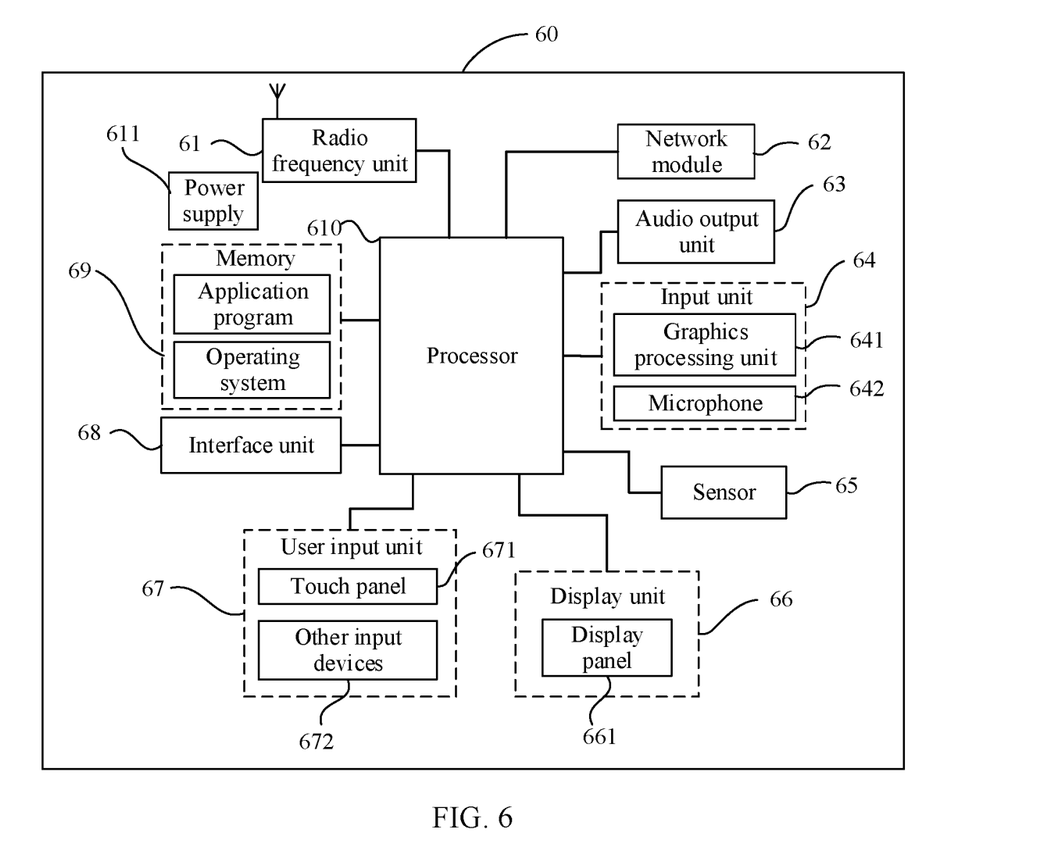
FIG. 6 is a block diagram of a terminal according to an embodiment of this disclosure.

To better achieve the foregoing objective, further, FIG. 6 is a schematic diagram of a hardware structure of a terminal for implementing each embodiment of this disclosure. The terminal 60 includes but is not limited to components such as a radio frequency unit 61, a network module 62, an audio output unit 63, an input unit 64, a sensor 65, a display unit 66, a user input unit 67, an interface unit 68, a memory 69, a processor 610, and a power supply 611. A person skilled in the art may understand that the structure of the terminal shown in FIG. 6 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 61 is configured to obtain a mapping relationship between interlaces of physical random access channel PRACH resources and physical uplink shared channel PUSCH resources, where the interlace includes at least one PRACH resource unit; and send a random access message on a random access resource according to the mapping relationship, where the random access resource includes the PUSCH resources and the PRACH resources.

The processor 610 is configured to control the radio frequency unit 61 to receive and transmit data.

The terminal according to this embodiment of this disclosure obtains a mapping relationship between interlaces of physical random access channel PRACH resources and physical uplink shared channel PUSCH resources, and sends a random access message on a random access resource according to the mapping relationship, where the random access resource includes the PUSCH resources and the PRACH resources. In this way, a network device does not need to perform blind detection on all possible transmission positions of the PRACH resources and PUSCH resources in a random access procedure, thereby reducing processing complexity.

It should be understood that, in this embodiment of this disclosure, the radio frequency unit 61 may be configured to receive or transmit a signal in an information transmitting/receiving or call process. Specifically, the radio frequency unit 61 receives downlink data from a base station and transmits the downlink data to the processor 610 for processing; and transmits uplink data to the base station. Generally, the radio frequency unit 61 includes but is not limited to an antenna, at least one amplifier, a transceiver, a coupler, a low noise amplifier, a duplexer, and the like. In addition, the radio frequency unit 61 may further communicate with a network and another device through a wireless communications system.

The terminal provides wireless broadband internet access for a user by using the network module 62, for example, helps the user send and receive e-mails, browse web pages, and access streaming media.

The audio output unit 63 may convert audio data received by the radio frequency unit 61 or the network module 62 or stored in the memory 69 into an audio signal and output the audio signal as a sound. In addition, the audio output unit 63 may further provide audio output (for example, a call signal reception tone or a message reception tone) that is related to a specific function performed by the terminal 60. The audio output unit 63 includes a speaker, a buzzer, a telephone receiver, and the like.

The input unit 64 is configured to receive an audio or video signal. The input unit 64 may include a graphics processing unit (GPU) 641 and a microphone 642. The graphics processing unit 641 processes image data of a static picture or a video that is obtained by an image capture apparatus (for example, a camera) in a video capture mode or an image capture mode. A processed image frame may be displayed on the display unit 66. An image frame processed by the graphics processing unit 641 may be stored in the memory 69 (or another storage medium) or sent by the radio frequency unit 61 or the network module 62. The microphone 642 can receive a sound and can process the sound into audio data. The processed audio data can be converted, for outputting, into a format that can be sent to a mobile communication base station through the radio frequency unit 61 in a telephone call mode.

The terminal 60 further includes at least one sensor 65, for example, an optical sensor, a motion sensor, and other sensors. Specifically, the optical sensor includes an ambient light sensor and a proximity sensor. The ambient light sensor may adjust brightness of a display panel 661 based on intensity of ambient light. When the terminal 60 moves near an ear, the proximity sensor may disable the display panel 661 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 65 may also include a fingerprint sensor, a pressure sensor, an iris sensor, a molecular sensor, a gyroscope, a barometer, a hygrometer, a thermometer, an infrared sensor, and the like. Details are not described herein.

The display unit 66 is configured to display information input by the user or information provided for the user. The display unit 66 may include the display panel 661. The display panel 661 may be configured in a form of a liquid crystal display (LCD), an organic light-emitting diode (OLED), or the like.

The user input unit 67 may be configured to receive input digit or character information, and generate key signal input that is related to user setting and function control of the terminal. Specifically, the user input unit 67 includes a touch panel 671 and other input devices 672. The touch panel 671, also referred to as a touchscreen, may capture a touch operation performed by a user on or near the touch panel (for example, an operation performed by the user on the touch panel 671 or near the touch panel 671 by using any appropriate object or accessory such as a finger or a stylus). The touch panel 671 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 671 may be implemented in a plurality of forms, for example, as a resistive, capacitive, infrared, or surface acoustic wave touch panel. The user input unit 67 may further include other input devices 672 in addition to the touch panel 671. Specifically, the other input devices 672 may include but are not limited to a physical keyboard, a function key (such as a volume control key or a power on/off key), a trackball, a mouse, a joystick, and the like. Details are not described herein.

Further, the touch panel 671 may cover the display panel 661. After detecting a touch operation on or near the touch panel 671, the touch panel 671 transmits the touch operation to the processor 610 to determine a type of a touch event. Then the processor 610 provides corresponding visual output on the display panel 661 based on the type of the touch event. Although the touch panel 671 and the display panel 661 are used as two separate components to implement input and output functions of the terminal in FIG. 6, the touch panel 671 and the display panel 661 may be integrated to implement the input and output functions of the terminal in some embodiments. This is not specifically limited herein.

The interface unit 68 is an interface for connecting an external apparatus to the terminal 60. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 68 may be configured to receive input (for example, data information and electric power) from the external apparatus, and transmit the received input to one or more elements in the terminal 60; or may be configured to transmit data between the terminal 60 and the external apparatus.

The memory 69 may be configured to store a software program and various data. The memory 69 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 69 may include a high-speed random access memory, or may include a non-volatile memory, for example, at least one magnetic disk storage device, a flash memory device, or other volatile solid-state storage devices.

The processor 610 is a control center of the terminal, and is connected to all components of the terminal by using various interfaces and lines. By running or executing a software program and/or a module stored in the memory 69 and invoking data stored in the memory 69, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the modem processor may alternatively not be integrated into the processor 610.

The terminal 60 may further include the power supply 611 (for example, a battery) that supplies power to each component. Optionally, the power supply 611 may be logically connected to the processor 610 by using a power management system, so as to implement functions such as charging management, discharging management, and power consumption management by using the power management system.

In addition, the terminal 60 includes some functional modules that are not shown. Details are not described herein.

Optionally, an embodiment of this disclosure further provides a terminal, including a processor 610, a memory 69, and a computer program stored in the memory 69 and capable of running on the processor 610. When the computer program is executed by the processor 610, the processes of the foregoing embodiment of the information transmission method for a random access procedure are implemented, and a same technical effect can be achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device (or User Equipment). This is not limited herein.

An embodiment of this disclosure further provides a computer-readable storage medium, where the computer-readable storage medium stores a computer program. When the computer program is executed by a processor, the processes of the foregoing embodiment of the information transmission method for a random access procedure are implemented, and a same technical effect can be achieved. To avoid repetition, details are not described herein again. For example, the computer-readable storage medium is a read-only memory (ROM), a random access memory (RAM), a magnetic disk, or an optical disk.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method for this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, the objective of this disclosure may also be achieved by running a program or a group of programs on any computing apparatus. The computing apparatus may be a general apparatus of common sense. Therefore, the objective of this disclosure may also be achieved by merely providing a program product including program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in time sequence following the order of description, but are not necessarily performed in time sequence. Some steps may be performed in parallel or separate from each other.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. An information transmission method for a random access procedure, applied to a terminal side and comprising:
obtaining a mapping relationship between interlaces of physical random access channel (PRACH) resources and physical uplink shared channel (PUSCH) resources, wherein the interlace comprises at least one PRACH resource unit, wherein one PRACH resource unit corresponds to one random access preamble in one random access channel occasion (RO); and
sending a random access message on a random access resource according to the mapping relationship, wherein the random access resource comprises the PUSCH resources and the PRACH resources;
wherein the mapping relationship comprises:
the PRACH resources are mapped to the PUSCH resources in an ascending order of random access preamble indexes in one RO; or,
the PRACH resources are mapped to the PUSCH resources in an ascending order of DMRS port indexes in one physical uplink shared channel occasion (PUO).

2. The information transmission method for a random access procedure according to claim 1, wherein the mapping relationship comprises:
a first mapping relationship between PRACH resource units in the interlaces and physical uplink shared channel occasions (PUOs) corresponding to the PUSCH resources, wherein the first mapping relationship comprises: a mapping relationship between PRACH resource units in the interlaces in a PRACH resource group and the PUOs;
or
a second mapping relationship between PRACH resource units in the interlaces and PUSCH resource units in the PUOs corresponding to the PUSCH resources, wherein the second mapping relationship comprises: a mapping relationship between PRACH resource units in the interlaces in a PRACH resource group and PUSCH resource units in the PUOs.

3. The information transmission method for a random access procedure according to claim 2, wherein at least one PUSCH resource unit is determined based on at least one related parameter of the PUO, the related parameter comprises at least one of demodulation reference signal (DMRS) port information of the PUO and a scrambling identifier of the PUO.

4. The information transmission method for a random access procedure according to claim 2, wherein in one PRACH resource group, the mapping relationship between the interlaces and the PUOs is a mapping in the order of interlace indexes and PUO indexes.

5. The information transmission method for a random access procedure according to claim 2, wherein in one PRACH resource group, the mapping relationship between PRACH resource units in the interlaces and PUSCH resource units in the PUOs is a mapping in the order of interlace indexes and PUSCH resource unit indexes.

6. The information transmission method for a random access procedure according to claim 5, wherein in one PRACH resource group, the mapping relationship between PRACH resource units in the interlaces and PUSCH resource units in the PUOs is a mapping in the order of PRACH resource unit indexes and PUSCH resource unit indexes.

7. The information transmission method for a random access procedure according to claim 2, wherein the PRACH resource group is in one association period, one association period comprises at least one PRACH resource group, one PRACH resource group comprises at least one random access channel occasion (RO) corresponding to the PRACH resource, and one RO corresponds to at least one PRACH resource unit.

8. The information transmission method for a random access procedure according to claim 2, wherein the PRACH resource group is determined in one of the following manners:
classifying all ROs in every T time domain units as a PRACH resource group;
classifying every M ROs as a PRACH resource group in the order of RO indexes;
classifying all ROs in one association period as P PRACH resource groups according to the number P of groups in one association period; and
classifying all ROs in an association period as one PRACH resource group, wherein T, M and P are all positive integers.

9. The information transmission method for a random access procedure according to claim 2, wherein in one association period, the mapping relationship is a mapping in the order of PRACH resource group indexes and PUO indexes.

10. The information transmission method for a random access procedure according to claim 1, wherein the mapping relationship between the interlaces and the PUSCH resources is a mapping relationship between the interlaces and PUSCH resources corresponding to the PRACH resources.

11. A terminal, comprising a processor, a memory, and a computer program stored in the memory and running on the processor, wherein when the computer program is executed by the processor, an information transmission method for a random access procedure is implemented, and the method comprises:
obtaining a mapping relationship between interlaces of physical random access channel (PRACH) resources and physical uplink shared channel (PUSCH) resources, wherein the interlace comprises at least one PRACH resource unit, wherein one PRACH resource unit corresponds to one random access preamble in one random access channel occasion (RO); and
sending a random access message on a random access resource according to the mapping relationship, wherein the random access resource comprises the PUSCH resources and the PRACH resources;
wherein the mapping relationship comprises:
the PRACH resources are mapped to the PUSCH resources in an ascending order of random access preamble indexes in one RO; or,
the PRACH resources are mapped to the PUSCH resources in an ascending order of DMRS port indexes in one physical uplink shared channel occasion (PUO).

12. The terminal according to claim 11, wherein the mapping relationship comprises:
a first mapping relationship between PRACH resource units in the interlaces and physical uplink shared channel occasions (PUOs) corresponding to the PUSCH resources, wherein the first mapping relationship comprises: a mapping relationship between PRACH resource units in the interlaces in a PRACH resource group and the PUOs;
or
a second mapping relationship between PRACH resource units in the interlaces and PUSCH resource units in the PUOs corresponding to the PUSCH resources, wherein the second mapping relationship comprises: a mapping relationship between PRACH resource units in the interlaces in a PRACH resource group and PUSCH resource units in the PUOs.

13. The terminal according to claim 12, wherein the PUSCH resource unit is determined based on at least one related parameter of the PUO, the related parameter comprises at least one of demodulation reference signal (DMRS) port information of the PUO and a scrambling identifier of the PUO.

14. The terminal according to claim 12, wherein the PRACH resource group is in one association period, one association period comprises at least one PRACH resource group, one PRACH resource group comprises at least one random access channel occasion (RO) corresponding to the PRACH resource, and one RO corresponds to at least one PRACH resource unit.

15. The terminal according to claim 12, wherein the PRACH resource group is determined in one of the following manners:
classifying all ROs in every T time domain units as a PRACH resource group;
classifying every M ROs as a PRACH resource group in the order of RO indexes;
classifying all ROs in one association period as P PRACH resource groups according to the number P of groups in one association period; and
classifying all ROs in an association period as one PRACH resource group, wherein T, M and P are all positive integers.

16. A non-transitory computer-readable storage medium, wherein the non-transitory computer-readable storage medium stores a computer program, and when the computer program is executed by a processor, an information transmission method for a random access procedure is implemented, and the method comprises:
obtaining a mapping relationship between interlaces of physical random access channel (PRACH) resources and physical uplink shared channel (PUSCH) resources, wherein the interlace comprises at least one PRACH resource unit, wherein one PRACH resource unit corresponds to one random access preamble in one random access channel occasion (RO); and
sending a random access message on a random access resource according to the mapping relationship, wherein the random access resource comprises the PUSCH resources and the PRACH resources;
wherein the mapping relationship comprises:
the PRACH resources are mapped to the PUSCH resources in an ascending order of random access preamble indexes in one RO; or,
the PRACH resources are mapped to the PUSCH resources in an ascending order of DMRS port indexes in one physical uplink shared channel occasion (PUO).

17. The storage medium according to claim 16, wherein the mapping relationship comprises:
a first mapping relationship between PRACH resource units in the interlaces and physical uplink shared channel occasions (PUOs) corresponding to the PUSCH resources, wherein the first mapping relationship comprises: a mapping relationship between PRACH resource units in the interlaces in a PRACH resource group and the PUOs;
or
a second mapping relationship between PRACH resource units in the interlaces and PUSCH resource units in the PUOs corresponding to the PUSCH resources, wherein the second mapping relationship comprises: a mapping relationship between PRACH resource units in the interlaces in a PRACH resource group and PUSCH resource units in the PUOs.

18. The storage medium according to claim 17, wherein the PUSCH resource unit is determined based on at least one related parameter of the PUO, the related parameter comprises at least one of demodulation reference signal (DMRS) port information of the PUO and a scrambling identifier of the PUO.

19. The storage medium according to claim 17, wherein the PRACH resource group is in one association period, one association period comprises at least one PRACH resource group, one PRACH resource group comprises at least one random access channel occasion (RO) corresponding to the PRACH resource, and one RO corresponds to at least one PRACH resource unit.

20. The storage medium according to claim 17, wherein the PRACH resource group is determined in one of the following manners:
classifying all ROs in every T time domain units as a PRACH resource group;
classifying every M ROs as a PRACH resource group in the order of RO indexes;
classifying all ROs in one association period as P PRACH resource groups according to the number P of groups in one association period; and
classifying all ROs in an association period as one PRACH resource group, wherein T, M and P are all positive integers.

* * * * *